(12) United States Patent
Mayr et al.

(10) Patent No.: US 10,308,232 B2
(45) Date of Patent: Jun. 4, 2019

(54) HYDRAULIC BLOCK FOR A HYDRAULIC POWER UNIT OF A HYDRAULIC VEHICLE BRAKE SYSTEM

(71) Applicant: Robert Bosch GmbH, Stuttgart (DE)

(72) Inventors: Matthias Mayr, Rettenberg (DE); Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 647 days.

(21) Appl. No.: 14/651,854

(22) PCT Filed: Oct. 18, 2013

(86) PCT No.: PCT/EP2013/071846
§ 371 (c)(1),
(2) Date: Jun. 12, 2015

(87) PCT Pub. No.: WO2014/090455
PCT Pub. Date: Jun. 19, 2014

(65) Prior Publication Data
US 2015/0298675 A1    Oct. 22, 2015

(30) Foreign Application Priority Data
Dec. 13, 2012 (DE) .................. 10 2012 223 059

(51) Int. Cl.
*B60T 8/40* (2006.01)
*B60T 17/04* (2006.01)
*B60T 8/36* (2006.01)

(52) U.S. Cl.
CPC ............ *B60T 17/043* (2013.01); *B60T 8/368* (2013.01); *B60T 8/4081* (2013.01)

(58) Field of Classification Search
CPC ...................................................... B60T 8/4081
See application file for complete search history.

(56) References Cited

U.S. PATENT DOCUMENTS

| | | | |
|---|---|---|---|
| 6,192,685 B1* | 2/2001 | Bourlon | B60T 7/04 60/566 |
| 6,969,128 B2* | 11/2005 | Sekihara | B60T 8/368 303/113.1 |
| 2002/0125764 A1 | 9/2002 | Sakamoto | |
| 2006/0138860 A1* | 6/2006 | Hinz | B60T 8/368 303/119.3 |
| 2007/0108836 A1* | 5/2007 | Feigel | B60T 8/368 303/115.1 |

(Continued)

FOREIGN PATENT DOCUMENTS

| | | |
|---|---|---|
| CN | 102015389 A | 4/2011 |
| DE | 102 09 984 A1 | 10/2002 |
| DE | 10 2006 033 493 A1 | 2/2007 |

(Continued)

OTHER PUBLICATIONS

International Search Report corresponding to PCT Application No. PCT/EP2013/071846, dated Jan. 14, 2014 (German and English language document) (8 pages).

*Primary Examiner* — F Daniel Lopez
(74) *Attorney, Agent, or Firm* — Maginot, Moore & Beck LLP

(57) ABSTRACT

A hydraulic block for a hydraulic power unit of a hydraulic vehicle brake system includes a main brake cylinder bore and an intake that are integrated to form a pedal travel simulator.

9 Claims, 3 Drawing Sheets

(56) References Cited

U.S. PATENT DOCUMENTS

2011/0115282 A1* 5/2011 Dinkel .................. B60T 7/042
303/3

FOREIGN PATENT DOCUMENTS

| DE | 10 2006 059 924 A1 | 6/2008 |
|----|--------------------|--------|
| DE | 10 2009 054 985 A1 | 1/2011 |
| DE | 10 2012 022 549 A1 | 5/2013 |
| EP | 2641788 A1 | 9/2013 |
| WO | 00/46089 A1 | 8/2000 |
| WO | 2004/031013 A1 | 4/2004 |
| WO | 2004/074062 A1 | 9/2004 |
| WO | 2012/067196 A1 | 5/2012 |
| WO | 2012/150120 A1 | 11/2012 |
| WO | 2013/023953 A1 | 2/2013 |

* cited by examiner

HYDRAULIC BLOCK FOR A HYDRAULIC POWER UNIT OF A HYDRAULIC VEHICLE BRAKE SYSTEM

This application is a 35 U.S.C. § 371 National Stage Application of PCT/EP2013/071846, filed on Oct. 18, 2013, which claims the benefit of priority to Serial No. DE 10 2012 223 059.9, filed on Dec. 13, 2012 in Germany, the disclosures of which are incorporated herein by reference in their entirety.

BACKGROUND

The disclosure relates to a hydraulic block for a hydraulic power unit of a slip-controlled hydraulic vehicle brake system having the features of the disclosure.

Hydraulic blocks are known. These are typically low-profile cuboidal metal blocks for the installation of hydraulic components, such as hydraulic pumps, solenoid valves, hydraulic accumulators and damper chambers of a slip-controlled vehicle brake system. The hydraulic blocks hold the hydraulic components mechanically and connect them hydraulically, typically by means of bored connecting lines. A hydraulic block fitted with the hydraulic components forms a hydraulic power unit and is the heart of the slip control system. Low profile is intended to mean that hydraulic blocks often have a thickness which is approximately one quarter to one third and seldom more than half the length and width. In plan view, the hydraulic blocks are rectangular and are often almost square. Normally only hydraulic parts of the components are situated in the hydraulic block. Electromechanical parts, such as coils and armatures of the solenoid valves, project from the hydraulic blocks. An electric motor for driving the hydraulic pumps is likewise secured externally on the hydraulic block.

A hydraulic block of this kind is known from German Laid-Open Application DE 10 2006 059 924 A1. The known hydraulic block has receptacles for brake pressure buildup valves and for brake pressure reduction valves. The receptacles for the brake pressure buildup valves are arranged adjacent to one another in a row in the hydraulic block. The receptacles for the brake pressure reduction valves are arranged in the hydraulic block in another row parallel to the row of receptacles for the brake pressure buildup valves.

German Laid-Open Application DE 10 2009 054 985 A1 discloses a vehicle brake system which is suitable for "brake-by-wire" braking. "Brake-by-wire" refers to power braking of, for example, individual vehicle wheels to stabilize a motor vehicle in order to avoid skidding or to carry out braking for headway control. It is also possible to reduce a braking force, if required to zero. This occurs in electric vehicles or hybrid vehicles, for example, which are decelerated by operating an electric drive motor of the vehicle as a generator in order to recover kinetic energy of the motor vehicle during braking ("recuperation"). During a braking operation, the vehicle is decelerated partially or completely by operating the electric drive motor as a generator and otherwise by means of the vehicle brake system. In addition to the "brake-by-wire" mode, the known vehicle brake system can be operated by muscle power or power assistance.

For a brake pressure buildup for a "brake-by-wire" braking operation, the known vehicle brake system has a piston pump, the piston of which is moved by an electric motor by means of a screw mechanism.

Moreover, the known vehicle brake system has a pedal travel simulator to enable a pedal travel when the vehicle is being decelerated by operating an electric drive motor as a generator in order to recover energy. The pedal travel simulator is a piston-cylinder unit which, in the known vehicle brake system, is accommodated in a cylinder bore of a brake master cylinder in addition to the piston thereof. The piston-cylinder unit of the pedal travel simulator allows displacement of brake fluid and hence a pedal travel of a brake pedal without moving the piston or pistons of the brake master cylinder, i.e. without a brake pressure buildup. A simulator spring brings about a pedal force at the foot brake pedal in order to give a vehicle driver a pedal feel which is as normal as possible.

The brake master cylinder and, with it, the pedal travel simulator integrated therein and the piston pump for producing the brake pressure during a power braking operation are accommodated in a common housing in the known vehicle brake system.

SUMMARY

The hydraulic block according to the disclosure is provided for a hydraulic power unit of a hydraulic vehicle brake system. It has a brake master cylinder bore for the installation of a brake master cylinder or to accommodate one or more brake master cylinder pistons and a receptacle for a pedal travel simulator. The pedal travel simulator is, in particular, a piston-cylinder unit with a spring-loaded piston, into which brake fluid can be displaced from the brake master cylinder when the brake master cylinder is separated hydraulically from the vehicle brake system by closure of one or more isolating valves. This occurs, for example, during a power braking operation or during the deceleration of a motor vehicle having an electric machine in generator mode for energy recovery (recuperation). The electric machine is an electric drive motor of the motor vehicle, for example. The pedal travel simulator makes it possible to provide a pedal travel despite the hydraulic separation of the brake master cylinder from the vehicle brake system. By means of a simulator spring which acts on the piston of the pedal travel simulator, a pedal characteristic which is at least similar to a pedal characteristic during conventional braking by muscle power or power assistance is possible.

One advantage of the disclosure is compact and space-saving accommodation both of a brake master cylinder and of a pedal travel simulator in the hydraulic block of a hydraulic power units of a hydraulic vehicle brake system. A separate brake master cylinder is superfluous. Although a brake booster, in particular a conventional vacuum brake booster, is possible in principle, it is not provided. Hydraulic brake boosting or self energizing wheel brakes is/are preferred if brake boosting is desired. It is thereby possible to eliminate the installation space for a vacuum brake booster.

The dependent claims relate to advantageous embodiments and developments of the disclosure.

The disclosure provides two receptacles for two pedal travel simulators, which are connected hydraulically in parallel, for example. It is also possible, for example, to connect each of the two pedal travel simulators to a brake circuit of a dual circuit vehicle brake system. Through different diameters, piston strokes and/or simulator spring hardnesses, for example, the two pedal travel simulators allow a brake pedal characteristic which changes over a pedal travel, i.e. a change in a force/displacement ratio of a piston of the brake master cylinder over the travel thereof. Another advantage of two pedal travel simulators instead of one is space-saving accommodation: a volume divided into two pedal travel simulators can be accommodated in a flatter hydraulic block than is the case with one pedal travel simulator.

As regards compactness, accommodation in a hydraulic block and boring of the hydraulic block to connect hydraulic components, arrangement of the receptacle or receptacles for the pedal travel simulator or simulators on a transverse side of the hydraulic block and/or of the brake master cylinder bore parallel to and close to an opposite transverse side of the hydraulic block has proven. One embodiment of the disclosure provides a cylinder bore for a piston pump in a flat side of the hydraulic block. The cylinder bore can be provided centrally, i.e. in or close to a center of the flat side. Making the cylinder bore in a flat side instead of a longitudinal or transverse side makes possible a larger piston diameter and coaxial mounting of an electric motor for driving the piston pump.

The disclosure provides an oblique bore for connecting two receptacles for solenoid valves in the hydraulic block. "Oblique" refers to an angle which is not a right angle relative to at least one outer side of the hydraulic block, the oblique bore as it were departing from the Cartesian system of connecting lines, receptacles etc bored in the hydraulic block parallel to and/or at right angles to the sides and to one another. An imaginary extension of the oblique bore passes through a mouth of one of the two receptacles for solenoid valves, which the oblique bore connects. As a result, the oblique bore can be formed by one of the two receptacles and does not have to be bored outside a receptacle or the like in one of the sides of the hydraulic block and then resealed in a pressure tight manner.

The disclosure provides three rows of receptacles for solenoid valves of a slip control system in a hydraulic vehicle brake system on a flat side of the hydraulic block. In particular, the receptacles for the solenoid valves are provided on a flat side of the hydraulic block which lies opposite the flat side of the hydraulic block which has the cylinder bore for the piston pump of the hydraulic vehicle brake system. For example, brake pressure buildup valves are arranged in one row, brake pressure reduction valves are arranged in another row, and further valves, such as isolating valves and/or intake valves, are arranged in yet another row in/on the hydraulic block, e.g. the brake pressure buildup valves are arranged in a first row, the brake pressure reduction valves in a second row and the further valves in a third row of the hydraulic block. One or more receptacles for one or more further solenoid valves can be provided in an additional row between the other rows (which would change the counting sequence thereof) or preferably as a fourth row (or, alternatively, as a first row, in which case the row number of the other rows increases by one) outside the three rows on the flat side of the hydraulic block. Apart from the receptacle for further solenoid valves, such an additional row can also have one or more receptacles for pressure sensors. This gives a hydraulic block with, for example, four or five rows of receptacles for solenoid valves and/or pressure sensors. For example, a first row has one or more receptacles for one or more pressure sensors, a second to fourth row has receptacles for solenoid valves, in particular a second row of receptacles for brake pressure buildup valves, a third row has receptacles for brake pressure reduction valves and a fourth row has receptacles for further solenoid valves, such as isolating valves and/or intake valves, and a fifth row has one or more receptacles for further valves and/or pressure sensors.

The disclosure provides a cuboidal hydraulic block. In particular, this is intended to mean that the hydraulic block does not have any raised portions, bulges or the like on its sides to accommodate hydraulic components, such as the brake master cylinder bore, the pedal travel simulator, the piston pump, hydraulic accumulators or damper chambers. Although not provided, fastening lugs or the like on the hydraulic block are conceivable, for example. A cuboidal shape without protruding portions or the like enables the hydraulic block to be produced with a small volume of swarf.

BRIEF DESCRIPTION OF THE DRAWINGS

The disclosure is explained in greater detail below by means of an embodiment. In the drawings.

Figure 1:
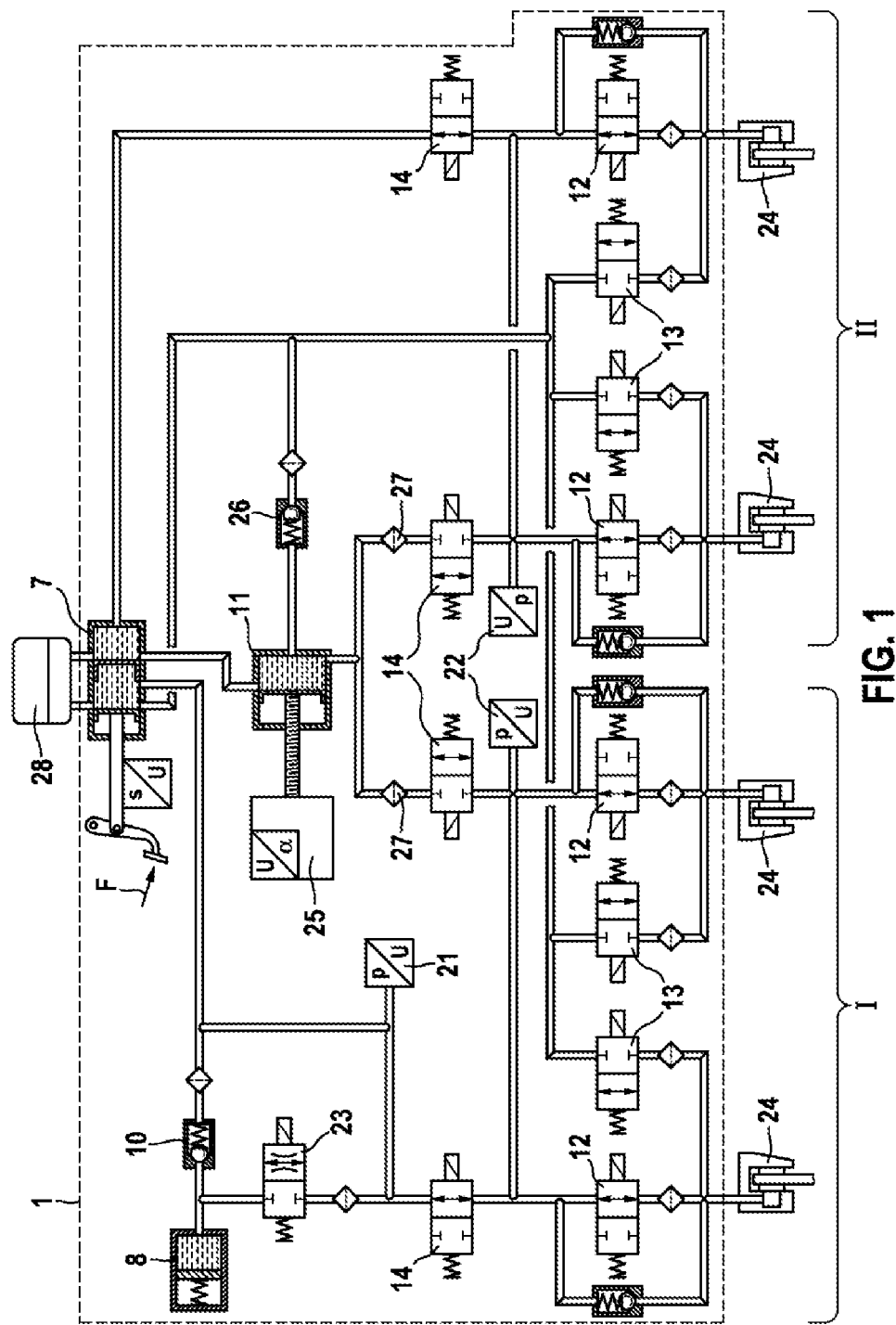
FIG. 1 shows a hydraulic circuit diagram of a slip-controlled vehicle brake system.

The hydraulic block is shown as transparent in order to show the bores therein. The drawing should be taken to be a schematic and simplified representation to aid understanding and to elucidate the disclosure.

DETAILED DESCRIPTION

Figure 2:
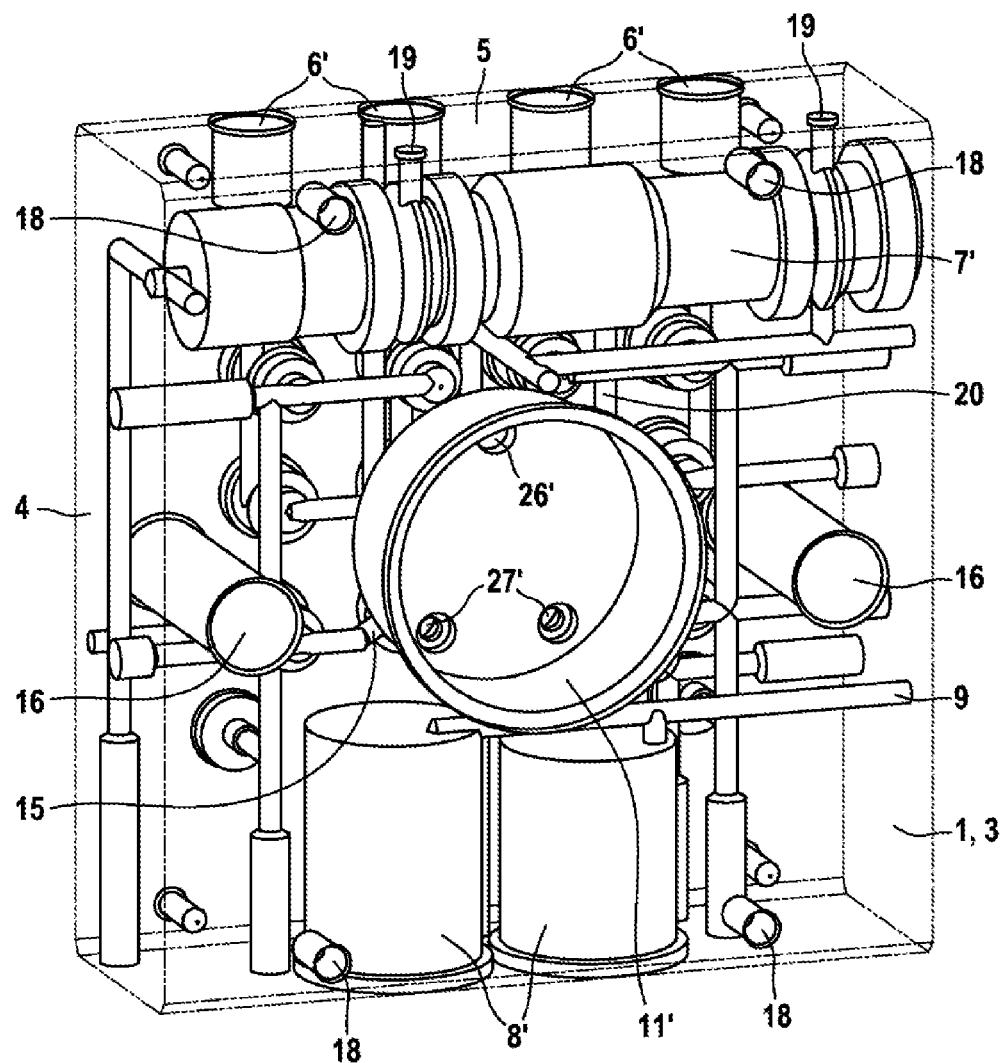
FIGS. 2 and 3 show a hydraulic block according to the disclosure in perspective view looking at one side of the motor (FIG. 2) and at an opposite control unit side (FIG. 3).
Figure 3:
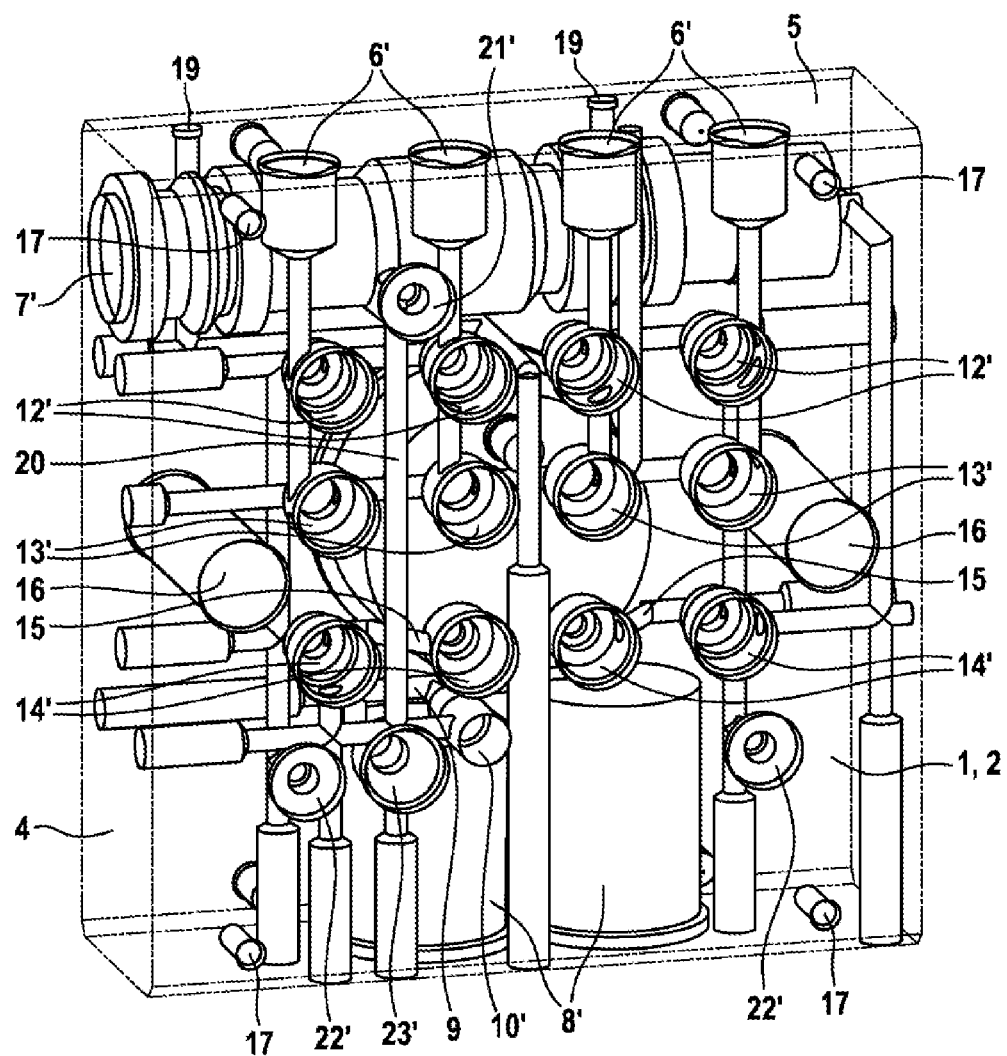

Hydraulic components of a hydraulic power unit of a slip control system in a vehicle brake system are accommodated in a hydraulic block 1, which is shown in FIGS. 2 and 3. A hydraulic circuit diagram of the vehicle brake system is depicted in FIG. 1. The vehicle brake system has a muscle-powered tandem or dual circuit brake master cylinder 7, to which two brake circuits I, II are connected. Each brake circuit I, II has two wheel brakes 24, which are each connected to the respective brake circuit I, II by a brake pressure buildup valve 12 and a brake pressure reduction valve 13. The brake pressure buildup valves 12 and brake pressure reduction valves 13 can also be understood as wheel brake pressure modulation valve arrangements, by means of which wheel brake pressures in the wheel brakes 24 and hence braking forces on the vehicle wheels can be regulated in a wheel-specific manner. Such control systems are known and will not be explained further here.

In each brake circuit I, II, the vehicle brake system has an isolating valve 14, by means of which the brake circuits I, II can be separated hydraulically from the brake master cylinder 1. The isolating valves 14 are arranged between the brake master cylinder 1 and the brake pressure buildup valves 12.

A pressure in a chamber of the dual circuit brake master cylinder 7 can be measured by means of a brake master cylinder pressure sensor 21.

A spring- or gas-pressure-loaded hydraulic accumulator is connected as a pedal travel simulator 8 in one brake circuit I and thus to one chamber of the brake master cylinder 7. When the isolating valves 14 are closed, this hydraulic accumulator receives brake fluid from the brake master cylinder 7, allowing the brake master cylinder 7 to be actuated even when the isolating valves 14 are closed. A normal or at least approximately normal pedal feel is thereby imparted to a vehicle driver during the actuation of the brake master cylinder 7 when said driver actuates the brake master cylinder 7 while the isolating valves 14 are closed. The pedal travel simulator 8 is connected to the brake master cylinder 7 by a selector valve 23. Brake fluid can flow back from the pedal travel simulator 8 into the brake circuit I or the brake master cylinder 7 via a check valve 10.

For power brake actuation, the vehicle brake system has a piston-cylinder unit 11, the piston of which can be moved by means of an electric motor 25 via a screw mechanism, if required with the interposition of a reduction gear. The piston-cylinder unit 11 acts on both brake circuits I, II, which are connected to the piston-cylinder unit 11 via respective further isolating valves 14. Via a snifter hole of the kind known from brake master cylinders, the piston-cylinder unit 11 is connected to a chamber of the brake master cylinder 7. The connection exists only when the piston of the piston-cylinder unit 11 is retracted.

At the beginning of a movement into the cylinder, the piston crosses the snifter hole, like the pistons of the brake master cylinder 7, with the result that the piston-cylinder unit 11 is separated from the brake master cylinder 7. During a return movement of the piston, the piston-cylinder unit 11 can draw in brake fluid via a check valve 26 from one of the two brake circuits II or from a chamber of the brake master cylinder 7 if the brake master cylinder 7 is not actuated.

Each brake circuit I, II has a brake circuit pressure sensor 22.

Said valves 10, 12, 13, 14, 23 are 2/2-way solenoid valves, wherein the brake pressure buildup valves 12 and the isolating valves 14 which connect the brake circuits I, II to the brake master cylinder 7 are open in the deenergized home positions thereof and the brake pressure reduction valves 13, the further isolating valves 14, which connect the piston-cylinder unit 11 to the brake circuits I, II, and the intake valve 23 are closed in the deenergized home positions thereof. With the exception of the wheel brakes 24, all the hydraulic components mentioned, i.e. the solenoid valves 12, 13, 14, 23, the brake master cylinder 7, the pedal travel simulator 8, the check valves 10, 12, the piston-cylinder unit 11 and the pressure sensors 21, 22 are accommodated in the hydraulic block 1 and interconnected hydraulically, said hydraulic block being shown in FIGS. 2 and 3 and explained below. As mentioned, the wheel brakes 24 and a brake fluid reservoir 28 are not accommodated in the hydraulic block 1. The brake fluid reservoir 28 is mounted externally on one transverse side 5 of the hydraulic block 1, and the wheel brakes 24 are connected to the hydraulic block 1 by brake lines.

The hydraulic block 1 depicted in FIGS. 2 and 3 is used for mechanical fastening and hydraulic interconnection of the hydraulic components of the hydraulic power unit or slip control system of the vehicle brake system in FIG. 1, which has been described above. Hydraulic parts of the components are located in receptacles, installation spaces and the like in the hydraulic block 1, and electrotechnical and electromechanical parts, such as coils and armatures of solenoid valves project externally from the hydraulic block 1. An electric motor for driving a hydraulic pump is fastened to the outside of the hydraulic block 1. The hydraulic block 1 is shown without these fitted, i.e. without the hydraulic components. The receptacles are cylindrical bores, some of them of stepped diameter, in the hydraulic block 1. For hydraulic interconnection, bores are formed as connecting lines or, more generally, as lines in the hydraulic block 1. The receptacles and lines are arranged parallel or at right angles to one another and to edges and outer surfaces of the hydraulic block 1, i.e. in a Cartesian coordinate system. In FIGS. 2 and 3, the receptacles in the hydraulic block 1 are provided with the reference numbers of the hydraulic components from FIG. 1 which are to be arranged in them, with the reference number being supplemented by a '. The hydraulic block 1 is a low-profile cuboid, its thickness amounting approximately to one quarter of the length or width thereof, and it is virtually square in elevation. For unambiguous designation and distinction, the flat side of the hydraulic block 1 which can be seen in FIG. 2 is referred to as the control unit side 2, while the flat side which can be seen in FIG. 3 is referred to as the motor side 3 and the side faces are referred to as longitudinal sides 4 and transverse sides 5. The hydraulic block 1 is mirror-symmetrical with respect to an imaginary longitudinal center plane.

The hydraulic block 1 has four ports 6' for wheel brakes, which are arranged adjacent to one another in a row on one transverse side 5, close to the control unit side 2 of the hydraulic block 1. The ports 6' are blind holes, which are open on the transverse side 5. They can have an internal thread for the fastening of brake lines by screwing or for fastening by caulking, crimping or the like.

Close to the motor side 3 and the transverse side 5 on which the ports 6' for the wheel brakes are arranged, the hydraulic block 1 has a brake master cylinder bore 7', which is open on a longitudinal side 4 of the hydraulic block 1. "Bore" does not mean that the brake master cylinder bore 7' must be produced by boring. Pistons of a brake master cylinder can be inserted directly into the brake master cylinder bore 7', or a brake master cylinder is inserted, e.g. press-fitted, in a manner similar to a cylinder liner into the brake master cylinder bore 7.

On the opposite transverse side 5 from the ports 6' for the wheel brakes and the brake master cylinder bore 7', the hydraulic block 1 has two receptacles 8' for pedal travel simulators. These are cylindrical blind holes, which are open on the transverse side 5 and which, allowing for a sufficient wall thickness, take up virtually the entire thickness of the hydraulic block 1 between the motor side 3 and the control unit side 2. The receptacles 8 for the pedal travel simulators are connected to one another by a bore 9 in the hydraulic block 1, which is formed from one longitudinal side 4 and extends parallel to the transverse sides 5 of the hydraulic block 1 at the level of the bottoms of the receptacles 8' for the pedal travel simulators and issues into the receptacles 8' at the bottoms. The pedal travel simulators are thereby connected hydraulically in parallel and therefore act like a single pedal travel simulator. Division into two receptacles 8 allows a large volume and, by means of two different simulator springs for example, allows a nonlinear force/displacement relationship, i.e. a nonlinear pedal characteristic of a brake pedal. The two receptacles 8 for the pedal travel simulators are arranged on both sides of a longitudinal center plane of the hydraulic block 1. The pedal travel simulators are connected to the brake master cylinder bore 7' by a receptacle 10' for check valve 10 and a bore 20, which extends parallel to the longitudinal sides of the to the side of the longitudinal center plane of the hydraulic block 1.

Approximately in a center of the motor side 3 and between the brake master cylinder bore 7' and the two receptacles 8' for the pedal travel simulators, the hydraulic block 1 has a cylindrical counterbore as a cylinder bore 11' for the piston-cylinder unit 11 of the vehicle brake system.

Three bores 26', 27' issue in a bottom of the cylinder bore 11. One of the bores 26', centrally at the top (at "12 o'clock") in the cylinder bore 11 in FIG. 2, forms a receptacle 26' for check valve 26, which connects the cylinder bore 11' or piston-cylinder unit 11 to one brake circuit II of the vehicle brake system. The two other bores 27', which are situated to the side of the center at the bottom in the cylinder bore 11' in FIG. 2 (at "5 o'clock" and at "7 o'clock"), form receptacles for the filters 27, which are arranged between the piston-cylinder unit 11 and the further isolating valves 14.

On the opposite side, i.e. on the control unit side 2, the hydraulic block 1 has three rows of four receptacles 12', 13', 14' for the solenoid valves 12, 13, 14. The three rows are arranged between the ports 6' for the wheel brakes and the receptacles 8' for the pedal travel simulators. These are cylindrical stepped blind holes. The four receptacles 12' which are closest to the ports 6' for the wheel brakes are provided for installation of the brake pressure buildup valves 12. The receptacles 13' in the central row are provided for the installation of the brake pressure reduction valves 13 and the receptacles 14', which are closest to the receptacles 8' for the pedal travel simulators, are provided for the installation of the isolating valves 14. Respective pairs of adjacent receptacles 14' for the isolating valves 14 are connected to one another by oblique bores 15. The oblique bores 15 extend obliquely to the flat sides of the hydraulic block, i.e. obliquely to the motor side 3 and to the control unit side 2 and they are bored through one of the receptacles 14, i.e. the imaginary extensions thereof pass through mouths of in each case one of the receptacles 14' for the isolating valves 14. This enables the oblique bores 15 to be produced neither from a longitudinal side nor a transverse side of the hydraulic block 1.

On the control unit side 2, between the first row with the receptacles 12' for the brake pressure buildup valves 12 and the transverse side 5 of the hydraulic block 1 which has the ports 6' for the wheel brakes 24, the hydraulic block 1 has a receptacle 21' for the brake master cylinder pressure sensor 21. Receptacle 21' is connected by a vertical bore at the bottom thereof, which issues into the brake master cylinder bore 7', directly to the brake master cylinder bore 7'. The receptacle 21' for the brake master cylinder pressure sensor 21 is situated laterally adjacent to the longitudinal center plane of the hydraulic block 1, between an outer and an inner receptacle of the receptacles 12' for the brake pressure buildup valves 12 as seen in a lateral direction.

Likewise on the control unit side 2, between the third row with the receptacles 14' for the isolating valves 14 and the transverse side 5 of the hydraulic block 1 which has the receptacles 8' for the pedal travel simulators, the hydraulic block 1 has two receptacles 22' for the brake circuit pressure sensors 22. As seen in a lateral direction, the receptacles 22' are arranged offset somewhat outward relative to the outer receptacles 14' for the isolating valves 14.

A receptacle 23' for the selector valve 23 is provided on the control unit side 2 of the hydraulic block 1, between the receptacle 10' for the check valve 10 and one of the two receptacles 22' for the brake circuit pressure sensors 22.

In an imaginary transverse plane parallel to the transverse sides 5 of the hydraulic block 1, in a center between the rows of receptacles 13', 14' for the brake pressure reduction valves 13 and for the isolating valves 14, the hydraulic block 1 has two through holes 16 perpendicular to the flat sides thereof, i.e. perpendicular to the motor side 3 and to the control unit side 2. The holes 16 are situated to the outside of the respective outer receptacles 13', 14' for the brake pressure reduction valves 13 and the isolating valves 14, i.e. between said receptacles 13', 14' and the longitudinal sides 4 of the hydraulic block 1. One of the two holes 16 is used to pass electric connection leads for an electric motor through from the control unit side 2 to the motor side 3, while the other hole 16 is used to pass signal lines to and from the electric motor from the control unit side 2 to the motor side 3 of the hydraulic block 1. The two holes 16 allow the power supply lines to be passed through in a manner spatially separated from the signal lines.

The hydraulic block 1 has four fastening holes 17 for a control unit on the control unit side 2 and four fastening holes 18 for an electric motor on the motor side 3. The fastening holes 17, 18 are blind holes with internal threads. The positioning thereof on the motor side 3 and the control unit side 2 is dependent on fastening holes of the electric motor and of the control unit, the fastening holes 17 for the control unit being arranged close to the corners of the hydraulic block 1 and the fastening holes 18 for the electric motor being arranged close to the transverse sides and offset inward from the longitudinal sides in the case of the hydraulic block 1 shown.

In principle, the hydraulic block 1 is possible with any desired combinations of the ports 6', receptacles 8', 10', 11', 12', 13', 14', bores 7', 9, 11, 15 etc., e.g. embodiment of the hydraulic block 1 without the brake master cylinder bore 7', the receptacles 8' or just one receptacle 8 for the pedal travel simulators and/or the cylinder bore 11' for the piston-cylinder unit pump 11, for example. On the transverse side 5 on which the ports 6' for the wheel brakes are situated and close to which the brake master cylinder bore 7' is situated, the hydraulic block 1 has two connection bores 19 for the brake fluid reservoir 28. The brake fluid reservoir 28 is mounted on the transverse side 5 of the hydraulic block 1 and secured there. The connection bores 19 issue into the brake master cylinder bore 7'.

The invention claimed is:

1. A hydraulic block for a hydraulic power unit of a hydraulic vehicle brake system, comprising:
   a brake master cylinder bore defined in the hydraulic block; and
   a first receptacle defined in the hydraulic block and configured for a first pedal travel simulator,
   wherein the first receptacle is defined in a first transverse side of the hydraulic block,
   wherein the brake master cylinder bore extends parallel to the first transverse side of the hydraulic block,
   wherein the brake master cylinder bore is arranged closer to a second transverse side of the hydraulic block that is opposite the first transverse side than to the first transverse side, the brake master cylinder bore extending into the hydraulic block parallel to the second transverse side, and
   wherein the hydraulic block defines a second receptacle configured for a second pedal travel simulator, and the first and second receptacles are hydraulically connected by a travel simulator bore.

2. The hydraulic block as claimed in claim 1, further comprising:
   a piston-cylinder unit bore defined in a first flat side of the hydraulic block that is between the first and second transverse sides, the piston-cylinder unit bore configured for a piston-cylinder unit of the hydraulic vehicle brake system.

3. The hydraulic block as claimed in claim 1, further comprising:
   a third receptacle defined in the hydraulic block and configured for a first solenoid valve; and
   a fourth receptacle defined in the hydraulic block and configured for a second solenoid valve,
   wherein the third and fourth receptacles are connected by an oblique bore defined in the hydraulic block extending obliquely to the third and fourth transverse sides in such a way that an imaginary extension of an outer circumference of the oblique bore passes through a mouth of one of the third and fourth receptacles.

4. The hydraulic block as claimed in claim 1, further comprising:
- a first row of valve receptacles defined in a first flat face of the one-piece cuboidal structure, the first row of receptacles configured for a first set of solenoid valves;
- a second row of valve receptacles defined in the first flat face and configured for a second set of solenoid valves;
- a third row of valve receptacles defined in the first flat face and configured for a third set of solenoid valves; and
- a further valve receptacle defined in the first flat face and configured for a further solenoid valve, wherein the further receptacle is not in any of the first, second, and third rows.

5. The hydraulic block as claimed in claim 4, wherein the first set of solenoid valves for which the first row of valve receptacles is configured are brake pressure buildup valves, the second set of solenoid valves for which the second row of valve receptacles is configured are brake pressure reduction valves, and third set of solenoid valves for which the third row of valve receptacles is configured are isolating valves.

6. The hydraulic block as claimed in claim 4, wherein the hydraulic block includes a second flat side opposite the first flat side, and the first and second transverse sides are transverse to the first and second flat sides.

7. The hydraulic block as claimed in claim 1, further comprising:
- a first through hole configured for power supply lines of an electric motor; and
- a second through hole configured for signal lines leading to and/or from the electric motor.

8. The hydraulic block as claimed in claim 7, further comprising:
- a piston-cylinder unit bore defined in a first flat side of the hydraulic block that is between the first and second transverse sides, the piston-cylinder unit bore configured for a piston-cylinder unit of the hydraulic vehicle brake system,
- wherein the first and second through holes are arranged on opposite sides of the piston-cylinder unit bore.

9. The hydraulic block as claimed in claim 1, wherein the hydraulic block includes a first flat side and a second opposite flat side, and the first and second transverse sides are transverse to the first and second flat sides.

* * * * *